3,814,812
MEDICAMENT AND METHOD OF INCREASING THE CALCIUM CONTENT OF THE BLOOD

Pierre Luc Georges Eymard, Fontaine, France, assignor to Laboratories J. Berthier S.A., Grenoble, France
No Drawing. Filed Feb. 23, 1971, Ser. No. 117,950
Claims priority, application France, Feb. 24, 1970, 7006583
Int. Cl. A61k 27/00
U.S. Cl. 424—318                    1 Claim

ABSTRACT OF THE DISCLOSURE

A derivative of dipropylacetic acid having the formula:

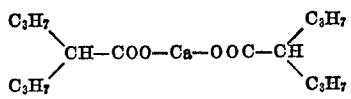

which when mixed with a pharmaceutically acceptable carrier medium is administered to humans and animals to increase the calcium content of the blood, is prepared by stirring and heating to less than 100° C. a mixture of water and calcium oxide, adding dipropylacetic acid, keeping the mixture for several hours below 100° C., filtering, concentrating the filtrate, treating the filtrate with acetone, removing the acetone and drying the residue.

---

The present invention relates to a derivative of dipropylacetic acid and a process of preparing this derivative.

It is an object of the present invention to provide calcium dipropylacetate as a medicament.

It is a further object of the present invention to provide a process for preparing calcium dipropylacetate.

It is a further object of the present invention to provide a method of increasing the calcium content of the blood of humans and animals.

The dipropylacetate derivative according to the invention has the formula:

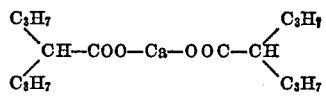

It has been found that a medicament based on calcium dipropylacetate when adminstered, for example in the form of a tablet, or an injectable or drinkable solution, gives rise to a raised calcemia in a fairly short time.

Accordingly, the present invention further provides a therapeutic composition comprising a pharmaceutically acceptable carrier medium and calcium dipropylacetate. The therapeutic composition may be in the form of a tablet containing 50 mg. to 500 mg. of calcium dipropylacetate, or in the form of an injectable solution containing 0.5 to 2.5% calcium dipropylacetate, or in the form of a solution for oral administration containing 0.5 to 2.5% calcium dipropylacetate.

According to the invention, the preparation of calcium dipropylacetate is carried out in accordance with the following general scheme:

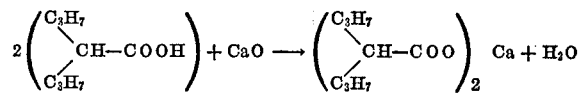

The calcium salt of the invention was subjected to the following pharmacological tests to compare its effectiveness, as an agent capable of increasing the calcium content of the blood as compared with other selected calcium salts mentioned.

COMPARATIVE STUDY OF $Ca^{++}$ RESORPTION AND CALCEMIA OBTAINED AS OPPOSED TO OTHER DIFFERENT CALCIUM SALTS

In what follows, for the sake of convenience the salt of the invention will be denoted by a code number: B39.65.

The products employed for comparison with B39.65 are the most commonly therapeutically used calcium salts: calcium chloride, $6H_2O$, calcium glucogalactogluconate, calcium acetate, calcium glucoheptogluconate, calcium lactate.

Male rats of IFFA strain having a weight of about 200 g. are used, which have adapted to the temperature (25° C.) as well as the feeding in the animal house, and have been on a water diet for the previous 24 hours.

All the products are introduced with an oesophageal probe directly into the stomach, as an aqueous solution.

Calcemia is measured at different times after the administration of the different products. The method used consists of determining the amount of $Ca^{++}$ in the plasma by means of complexon III. This method of analysis, which requires ethylene diamine tetraacetic acid (EDTA), is described in "Les Methodes de la Chimie Analytique" (The Methods of Analytical Chemistry) by C. Charlot—1961—4th edition (Masson and Cie)—pp. 654–656.

At time $t(0)$ all the animals receive the various products except the control animals which receive 1 ml. of physiological serum.

Calcemia is measured at time $t+20$ minutes, $t+40$ minutes, $t+1$ hour, $t+1$ hour 20 minutes, $t+1$ hour 40 minutes, $t+2$ hours, $t+2$ hours 20 minutes, and $t+2$ hours 40 minutes.

The dose of $Ca^{++}$ element chosen is 5 mg. per kg. of weight, i.e. for the various products.

B39.65: 40.9 mg./kg.
$CaCl_2$, $6H_2O$: 27.3 mg./kg.
Ca acetate: 19.8 mg./kg.
Ca glucogalactogluconate: 2.5 ml. of the commercial solution per kg. of weight
Ca glucoheptogluconate: 1.8 ml. of the commercial solution per kg. of weight
Ca lactate: 2.52 ml. of the commercial solution per kg. of weight.

The results are given in Table I which follows:

TABLE I

Calcemia in mg. of $Ca^{++}$ per litre of plasma after administration of the product

| Product subjected to resorption by mouth at a dosage of 5 mg./kg. of $Ca^{++}$ element | Time which has elapsed after administration in minutes | | | | | | | |
|---|---|---|---|---|---|---|---|---|
| | 20 | 40 | 60 | 80 | 100 | 120 | 140 | 160 |
| *Control animals* | | | | | | | | |
| Physiological serum, 1 ml | 116 | 100 | 100 | 110 | 100 | 107 | 106 | 106 |
| *Treated animals* | | | | | | | | |
| B39.65 | 108 | 130 | 116 | 124 | 121 | 137.5 | 127 | 127 |
| Calcium acetate | 111 | 116 | 116 | | | 113 | 113 | 116 |
| Calcium chloride, $6H_2O$ | 106 | 127 | 127 | 120 | 115 | 106 | 110 | 100 |
| Ca glucogalactogluconate | 119 | 110 | 95.4 | 116 | | 108 | 96.4 | 111 |
| Ca glucoheptogluconate | 116 | 116 | 116 | 106 | 116 | 106 | 101 | 106 |
| Ca lactate | 116 | 114 | 116 | 116 | 116 | 97.5 | 95.4 | 97.5 |

It is evident from an examination of the figures in this table that the salt of the invention, B39.65, in aqueous solution and administered orally in an amount of 5 mg./kg. by weight of $Ca^{++}$ element, allows a better calcemia to be obtained, except for the first twenty minutes, than that achieved with the other mineral or organic $Ca^{++}$ salts commonly employed for therapeutic purposes, namely calcium chloride, acetate, glucogalactogluconate glucoheptogluconate and lactate.

It is clear that calcium in the form of dipropylacetate is better than administration of when the calcium is administered in the form of a known mineral or organic salt.

EXAMPLE 1

4000 g. of purified water and 29.5 g. of quick-lime (calcium oxide) are mixed in reactor. The mixture is stirred. The mixture is heated to 70° C. and 144 g. (1 mol) of dipropylacetic acid are then introduced. The temperature is then raised to 80° to 90° and kept thereat for 4 hours. The mixture is then filtered through sintered glass and the filtrate is concentrated to dryness in an evaporator in vacuo ($p=100$ mm. Hg)—the temperature of the bath is 80° C. The residue is then taken up while stirring for 2 hours, in 120 g. of acetone. The residue is dried, and washed with 30 g. of acetone. The residue is finally dried in an oven under a vacuum ($p=200$ mm. Hg) to constant weight—temperature is 80° C. 107 g. of calcium dipropylacetate are thus obtained. Reaction yield: 65.5%.

The medicament according to the present invention is preferably provided in the form of a tablet containing 50 mg. to 500 mg. of calcium dipropylacetate or of injectable or drinkable solutions containing 0.5% to 2.5% of calcium dipropylacetate.

The following examples are non-limitative examples of different medicament formulations according to the present invention.

EXAMPLE 2

Tablet

| | Mg. |
|---|---|
| Calcium dipropylacetate | 250 |
| Magnesium stearate | 30 |
| Talc | 20 |
| Sodium dioctylsulfosuccinate | 2 |

Maize starch sufficient to provide a tablet of 330 mg.

EXAMPLE 3

2% injectable solution

| | G. |
|---|---|
| Calcium dipropylacetate | 2 |

Distilled water sufficient to provide 100 ml. of solution.

EXAMPLE 4

2% solution for oral administration

| | | |
|---|---|---|
| Calcium dipropylacetate | g | 2 |
| Methyl p-hydroxybenzoate | mg | 75 |
| Propyl p-hydroxybenzoate | mg | 75 |

Distilled water sufficient to provide 100 ml. of solution.

I claim:
1. A method of increasing the calcium content of the blood in a living host in need of said increase, comprising orally administering to said host, 5 mg./kg. of $Ca^{++}$ as a calcium dipropylacetate aqueous soultion.

References Cited

UNITED STATES PATENTS 2,140,291  12/1938  Jenkins _____ 424—315

OTHER REFERENCES

Chemical Abstracts (Meunier), vol. 61, 9405d (1964).
Chemical Abstracts (Meunier et al.), vol. 62, 13738d (1965).
Chemical Abstracts (Meunier), vol. 70, 60805w (1969).
Cutting's Handbook of Pharmacology, 4th ed., 1969, pp. 64, 205–206, 349, 470–471 and 617.

ALBERT T. MEYERS, Primary Examiner
N. A. DREZIN, Assistant Examiner

U.S. Cl. X.R.
424—154